United States Patent [19]

Ke et al.

[11] Patent Number: 4,622,226

[45] Date of Patent: Nov. 11, 1986

[54] MODIFIED PUFF PASTRY AND PROCESS FOR PREPARING THE SAME

[75] Inventors: Victor H. Ke, Grand Prairie; Regina A. Brown, North Richland Hills, both of Tex.

[73] Assignee: Frito Lay, Inc., Dallas, Tex.

[21] Appl. No.: 728,214

[22] Filed: Apr. 29, 1985

[51] Int. Cl.$^4$ .......................................... A21D 13/08
[52] U.S. Cl. ........................................ 426/94; 426/556
[58] Field of Search ......................... 426/556, 94, 578

[56] References Cited

U.S. PATENT DOCUMENTS 2,172,211  1/1938  Lloyd ................................. 426/556
3,222,189 12/1965  Perrozzi ............................ 426/556
4,297,378 10/1981  Hassl ................................. 426/556

OTHER PUBLICATIONS

Leung, H. K. et al., *Journal of Food Science*, vol. 49, pp. 1405–1409, 1984.

*Primary Examiner*—Raymond N. Jones
*Assistant Examiner*—Elizabeth A. King
*Attorney, Agent, or Firm*—Bernard, Rothwell & Brown

[57] ABSTRACT

Ready to eat puff pastries having excellent textures, and a longer shelf life are produced by baking a multi-layered laminate comprising alternating layers of a dough and a roll-in shortening wherein the flour in the dough is partially substituted with a dextrin.

28 Claims, No Drawings

MODIFIED PUFF PASTRY AND PROCESS FOR PREPARING THE SAME

BACKGROUND OF THE INVENTION

The present invention relates to new and improved puff pastries. These pastries exhibit a flaky consistency and reduce the problem of product sogginess after baking.

Puff pastries are laminated, flaky products with a distinctly layered structure. Pastry dough has many layers of dough separated by layers of fat. During baking, steam is formed and evaporated causing the expansion of the dough layers. The fat insulates the dough layers, allowing each to cook individually and puff the pastry. As the gluten coagulates, it forms into a light open structure with fine layers.

Unfortunately, puff pastries have a limited shelf life, i.e., about seven days, due to their hygroscopic nature. Therefore, the pastries become tough and chewy over time as they absorb moisture from their surroundings. The hygroscopic nature of the pastries is especially a problem when the pastry contains various high-moisture fillings since the fillings' moisture migrates to the pastry.

Unfilled puff pastry items are usually reheated in microwave or conventional ovens prior to serving. This process restores the eating quality of the freshly baked product. However, flaky, center-filled (e.g., cheese, cream, etc.) products must be purchased from a retail store and served immediately because of the short shelf life. Most wholesale bakeries overcome this problem by making frozen pastry products, so the consumer can complete the baking process at home to insure the freshness and the flakiness of the product every time. Therefore, a need exists for delectable, ready to eat puffed pastry products which have an extended shelf life.

SUMMARY OF THE INVENTION

The present invention relates to new and improved puff pastries. These pastries exhibit a flaky texture, low levels of water absorbtion and have a longer shelf life than conventional puff pastries. The puff pastries are made from a dough where a dextrin is partially substituted for the flour.

DETAILED DESCRIPTION OF THE PREFERRED EMBODIMENT

The present invention provides a puff pastry with an excellent texture while avoiding the tendency of sogginess after baking. Some advantages of the present pastries are they are ready to eat, exhibit a flaky texture, and have a longer shelf life.

Puff pastries are unique among bakery products. They are very light and flaky and can increase in size up to eight fold during baking. In making a puff pastry, a dough is first made from flour, an animal or vegetable fat, water and various optional ingredients such as salt, eggs, coloring agents, and flavoring agents. During this time, the principles are similar to making a bread dough as the flour protein is encouraged to develop to give the dough a certain amount of elasticity. After the dough has been made, a layer of animal or vegetable fat, also known as roll-in shortening, is added in such a way that two layers of dough enclose the layer of the roll-in shortening. This laminated dough is rolled out and folded three or four times, to build up a multi-layered laminate having alternating layers of dough and roll-in shortening. The multi-layered laminate is baked to produce a product having the characteristic open, light structure with discrete layers which is characteristic of puff pastry.

There is disclosed a process for producing a puff pastry of improved texture comprising baking a multi-layered laminate of dough and roll-in shortening wherein a dextrin is partially substituted for the flour used to make the dough.

Dextrins for use in the present invention are well known to those skilled in the art and can be produced from all commercial grain and tuber starches such as potato starch, tapioca starch, sago starch, and corn starch. Examples of dextrins which can be used in the present invention include tapioca dextrin, corn dextrin, potato dextrin, sago dextrin, sorghum dextrin, and wheat dextrin, with tapioca dextrin being preferred. The inventors have found that when corn or wheat dextrin is used, it is desirable to add flavoring agents to mask the corn or wheat taste. One example of a dextrin which is particularly suited for use in the present invention is tapioca dextrin sold under the trade name Crystal Gum ™ by National Starch and Chemical Corporation, Bridgewater, N.J. The use of dextrin as a partial substitute for flour serves four functions. First, the dextrin modifies the water absorption properties of the finished pastry. Second, the dextrin modifies the flaky texture of the finished pastry. Third, the dextrin serves to modify the dough rheology during the sheeting and laminating process. Fourth, with increasing amounts of dextrin, the baking times of the dough can be reduced. The amount of dextrin that is partially substituted for the flour should be an amount sufficient to achieve one or more of the above functions. The dextrin can range from about 14 to about 29 percent by weight of the total weight of the dough used to form the laminate. When the level of dextrin drops below 14 weight percent, the center-filled products tend to become soggy. When the dextrin level exceeds about 29 weight percent, the dough tends to tear making the dough unmanageable during sheeting. Optimally, the level of dextrin is about 20 to about 25 weight percent of the dough.

Various flours can be used to form the puffed pastries of the present invention. Examples of such flours are those conventionally used in the baking industry including bread flour, corn flour, potato flour, pastry flour, cracker flour and cake flour. Preferably, bread flour is used. Other preferred flours are those that have a high protein content; i.e., 14 percent or more by weight. Generally, the flour is added in amounts of from about 30 to about 42 weight percent of the dough. Preferably, the flour is from about 33 to about 36 weight percent of the dough. However, if a high protein flour (e.g., 14 percent or more protein) is used without the incorporation of additional gluten, the flour percentages would be proportionately higher such as from about 38 to about 49 weight percent of the dough. Preferably, the high protein flour is from about 42 to about 46 weight percent of the dough.

Gluten is a mixture of wheat proteins which forms the tough, rubbery, elastic substance when flour is mixed with water or a liquid containing water. The gluten forms a network which expands with the pressure of the steam. The expansion takes place until the gluten is denatured by the heat of the oven. Gluten also causes the steam produced during baking to be retained by the dough in a manner which provides the distinct layered structure of a puffed pastry. Most wheat flour contains approximately 11 percent by weight protein. By reducing the level of flour in the dough and substituting the dextrin therefore, the amount of gluten in the dough is concomitantly reduced. Since gluten is a necessary structure builder in the pastry dough, it is important to insure that the amount of gluten or protein is not reduced to unacceptably low levels. Accordingly, one embodiment of the present invention involves adding gluten to the dough, in addition to that present in the flour, in order to compensate for the reduction in gluten resulting from the reduced level of flour. The amount of gluten that should be added is such that the dough has a desirable elasticity for processing. Sufficient gluten is also required to assure that a proper amount of steam is available for puffing during baking. While the need for gluten would vary depending on the type and amount of flour which is substituted with the dextrin, generally for every 1 part of dextrin used, from about 0.14 to about 0.5 parts of gluten should be added. Therefore, the gluten to be added can range from about 2 to about 15 percent by weight of the dough to be laminated with the roll-in fat. Preferably, gluten is added in amounts of from 3 to 7 percent by weight of the dough. Another embodiment of the present invention is to simply use a high-protein flour instead of adding gluten to the dough as an additional ingredient. One example of a high-protein flour is spring wheat flour which has about 14 percent by weight of protein.

The fats that can be used in the pastries of the present invention can be high in unsaturation or they can be saturated fats. Saturated fats give a firmer texture to the pastry while the use of unsaturated fats provide a softer texture. Examples of such unsaturated fats include safflower oil, sunflower oil, cottonseed oil, soy bean oil and corn oil. The saturated fats that can be used include hydrogenated oil products of coconut, olive, corn, cottonseed, peanut, etc. Fats having melting points of 90°–125° F. are preferred. Generally, the fats are added in amounts of from about 3 to about 8 percent by weight of the overall weight of the dough. Preferably, the fat amounts to about 3.20 to about 4.0 percent by weight of the overall weight of the dough. These weight percentages of fat pertain only to that fat which is an ingredient of the dough, to be distinguished from the fat that is rolled-in with the dough to form puff pastries; i.e., the roll-in shortening. In preparing the multi-layered laminate the roll-in shortening is generally employed in an amount from about 20 to about 45 percent of the weight of the dough in the laminate. Accordingly, the total fat which is used in the present invention includes that used to form the dough and the fat which is rolled-in the dough to form a laminated dough which, when baked, becomes a puff pastry.

Water is added to form the doughs in conventional amounts. While the amount can vary, the water can be added in amounts of from 32 to 40 weight percent, preferably, 35 to 38 weight percent of the dough to be laminated.

Various food grade acidulents may be added to the dough. The use of acids has no direct bearing on the leavening or flakiness of the puffed pastry but acids relax the gluten of the dough by increasing its acidity and thus make sheeting of the dough easier and quicker. Examples of such acidulents include vinegar, lemon juice, fumaric, phosphoric, tartaric, malic, and citric acids. Preferably, the potassium salt of tartaric acid also known as cream of tartar is used. The food grade acidulents are generally added in conventional amounts such as from about 0.01 to about 2.0 weight percent based on the total weight of the dough to be laminated.

Flavoring agents can be added to the dough to impart various flavors to the pastry. While the amount of such flavoring agents will vary, generally, such agents are added in amounts of from about 0.05 to about 5 of the total weight of the dough to be laminated. Suitable flavoring agents include natural and synthetic flavorings which may impart such flavors as vanilla, cheese, chocolate, butter, coffee, fruit, mint, nuts, or other flavors.

Aside from the above ingredients, conventional additives can be included in the dough. Examples of such additives include food coloring, salt, minerals and vitamins. These ingredients are added in conventional amounts.

Once the dough comprising flour, dextrin, fat, and water, and any other optional ingredients has been formed, the dough is processed in a conventional manner. Current methods of forming puff pastries include resting the dough, rolling-in a fat to form a fat-dough laminate, a sheeting process, a folding process, a retarding process where the dough's temperature is lowered, usually to 40° F.–55° F., final sheeting process, and baking the dough at temperatures of from 350° F. to 500° F. If a dual textured product is desired, various fillings with a water activity equal to or less than 0.7 can be sandwiched between two layers of the dough. Preferably, the filling is thermostable so that the filling can be sandwiched between the dough prior to baking.

The invention will be illustrated by the following examples, but the invention is not limited thereto and is fully applicable to the foregoing disclosure.

EXAMPLE 1

Into a bowl equipped with a mechanical mixer were charged the following ingredients:

| Ingredients | Grams | % By Weight |
|---|---|---|
| Shortening (120° F.) | 20.10 | 3.51 |
| Cream of Tartar | 1.03 | 0.18 |
| Bread Flour (11% Protein) | 202.50 | 35.30 |
| Water | 208.20 | 36.30 |
| Crystal Gum TM | 121.60 | 21.20 |
| Wheat Gluten | 20.10 | 3.51 |
| | 573.53 | 100.00 |

The above ingredients were mixed for approximately three minutes until they were evenly dispersed. The dough had a temperature of 60° F. The dough was set aside for a rest time of 20 minutes and then rolled into a rectangular shape. Two-thirds of the dough was then covered with 172.1 g (30 percent by weight of dough) of roll-in fat (shortening 120° F.). The uncovered one-third of the dough was then folded over half of the fat-covered part. The remaining one-third of the dough was folded on top thereby forming three layers of dough and two layers of shortening. The dough-fat laminate was allowed to rest at a temperature of 35°–40° F. The dough was then formed into a sheet and folded four times so that there were 768 dough layers and 512 shortening layers. The folded dough was again rested at a temperature of 35°–40° F. and subjected to final sheeting at which time the dough had a temperature of 60° F. The dough was then processed to form the shape of croissants. The dough had a total relaxation time of 18 hours and was found to be very extendable during processing with no sheeting problems. Upon baking, the pastry showed a flaky texture after three hours cooling.

EXAMPLE 2

Using the same equipment and procedure of Example 1, the following ingredients were mixed:

| Ingredients | Grams | % By Weight |
| --- | --- | --- |
| Shortening (110° F.) | 78.42 | 3.27 |
| Cream of Tartar | 4.00 | 0.17 |
| Bread Flour (11% Protein) | 786.00 | 32.75 |
| Cold Water | 852.40 | 35.52 |
| Crystal Gum TM | 576.01 | 24.00 |
| Wheat Gluten | 83.17 | 3.46 |
| Annatto Color No. 3 | 1.20 | 0.05 |
| Norda EP 11-705 | 18.80 | 0.78 |
| | 2400.00 | 100.00 |

After baking, the dough had a crispy texture. The amount of roll-in shortening was 840 grams (35 percent by weight of the dough).

EXAMPLE 3

Using the same equipment and procedure of Example 1, the following ingredients were mixed:

| Ingredients | Grams | % By Weight |
| --- | --- | --- |
| Shortening (120° F.) | 83.04 | 3.46 |
| Cream of Tartar | 4.08 | 0.17 |
| Bread Flour (11% Protein) | 836.64 | 34.86 |
| Cold Water | 870.72 | 36.28 |
| Crystal Gum TM | 502.32 | 20.93 |
| Wheat Gluten | 83.04 | 3.46 |
| Annatto Color No. 3 | 1.20 | 0.05 |
| Norda EP 11-705 | 18.96 | 0.79 |
| | 2400.00 | 100.00 |

The only exceptions in the processing of this example from that of Example 1 were that 840 g (35 percent by weight of the dough) of rolled-in shortening was used and the dough temperature was 82° F. After baking, the pastry had a desirable flaky texture.

EXAMPLE 4

Using the equipment and procedure of Example 1, the following ingredients were mixed:

| Ingredients | Grams | % By Weight |
| --- | --- | --- |
| Shortening (120° F.) | 84.00 | 3.50 |
| Cream of Tartar | 4.32 | 0.18 |
| Bread Flour (11% Protein) | 847.20 | 35.29 |
| Cold Water | 871.20 | 36.29 |
| Crystal Gum TM | 508.80 | 21.19 |
| Wheat Gluten | 84.00 | 3.50 |
| Annatto Color No. 3 | 1.20 | 0.05 |
| | 2400.72 | 100.00 |

After the dough was suitably mixed and rested, the dough was folded in with 840 g (35 percent by weight of the dough) of roll-in shortening to form a laminated dough. The dough was then sheeted in a 1.5 mm layer. One gram of a thermostable creme was deposited on the sheeted pastry dough (1.5 mm; 1.8 g/piece). A second 1.5 mm layer of sheeted dough was added and the sandwiched product was cut into individual docked squares. The product was then baked at 500° F. for six minutes. After cooling the pastries, the outer layer had a flaky texture and the filling (thermostable creme) had a creamy texture. The pastry products were examined after 66 days storage in the laboratory at 75° F., and all the pastry products were judged to have retained their flaky texture.

EXAMPLE 5

For comparative purposes two dough laminate formulations were produced. The first formulation was of a conventional type and contained the following ingredients:

| Ingredients | Grams | % By Weight |
| --- | --- | --- |
| Shortening (120° F.) | 2,065.70 | 9.10 |
| Powdered Whole Egg | 388.80 | 1.50 |
| Cream of Tartar | 65.83 | 0.29 |
| Bread Flour (11% Protein) | 12,498.62 | 55.04 |
| Cold Water | 7,736.16 | 34.07 |
| | 22,705.11 | 100.00 |

The dough was combined with 4745.4 g (20.90 weight percent) of roll-in shortening.

The modified pastry dough formula of the present invention contained the following ingredients:

| Ingredients | Grams | % By Weight |
| --- | --- | --- |
| Shortening (120° F.) | 785.42 | 3.46 |
| Cream of Tartar | 38.59 | 0.17 |
| Bread Flour (11% Protein) | 7,913.22 | 34.85 |
| Cold Water | 8,237.83 | 36.29 |
| Crystal Gum TM | 4,751.11 | 20.93 |
| Gluten | 785.42 | 3.46 |
| Annatto Color No. 3 | 11.35 | 0.05 |
| Norda EP 11-705 | 179.33 | 0.79 |
| | 22,702.27 | 100.00 |

The total roll-in shortening was 4926.4 g (21.70 weight percent of the total weight of the modified dough). Both doughs were processed in the same manner and all samples were sheeted to 2.5 mm final thickness. To compare the pastries' quality from the two formulas as well as different folding processes, various numbers of fat layers and baking temperatures were utilized. The table below lists the conditions of the comparison.

| Number Of Fat Layers | Source | Baking | Height (mm) |
| --- | --- | --- | --- |
| 512 | Control | 375° F. for 15 minutes | 17.76 |
| 512 | Modified | 375° F. for 15 minutes | 14.51 |
| 128 | Control | 375° F. for 15 minutes | 14.98 |
| 128 | Modified | 375° F. for 15 minutes | 14.96 |
| 48 | Control | 375° F. for 15 minutes | 14.12 |
| 48 | Modified | 375° F. for 15 minutes | 15.16 |

All the control examples turned soggy after baking while the modified samples maintained their flakiness. The modified dough showed more smooth surface than the conventional dough prior to baking.

EXAMPLE 6

By varying the respective amounts of the dextrin, wheat flour, water, fat, and optional ingredients, one can produce pastries having a variety of textures. To demonstrate this, three dough laminates were produced which, after baking, resulted in three pastries all of which had desirable textures. The ingredients of the three doughs to form the laminates are listed according to their respective weight percent of the total weight of the dough and are as follows:

| Ingredients | Dough 1 | Dough 2 | Dough 3 |
| --- | --- | --- | --- |
| Shortening (110° F.) | 3.36 | 3.18 | 2.97 |
| Cream of Tartar | 0.18 | 0.16 | 0.16 |
| Wheat Flour (11% Protein) | 34.89 | 32.79 | 30.69 |
| Water | 36.31 | 35.55 | 34.78 |
| Tapioca Dextrin | 20.95 | 24.03 | 27.09 |
| Wheat Gluten | 3.46 | 3.46 | 3.48 |
| Food Color | 0.05 | 0.05 | 0.05 |
| Flavoring Agent | 0.80 | 0.78 | 0.78 |
|  | 100.00 | 100.00 | 100.00 |

Thirty-five weight percent of roll-in shortening (based on the weight of the dough) was combined with each dough and processed to form three-dough laminates. The dough laminates were baked at 500° F. Dough laminate 1 was baked for 7.0 minutes, dough laminate 2 was baked for 6.75 minutes, and dough laminate 3 was baked for 6.5 minutes. Dough laminate 1 was found to have an appealing flaky texture. Dough laminate 2 had a pleasing crispy texture while dough laminate 3 had a crunch consistency. Therefore, with increasing amounts of dextrin and lower amounts of wheat flour, a baked pastry will have decreased moisture content. This example also demonstrates that by varying the amounts of dextrin the baking times can be reduced.

What is claimed is:

1. A process for producing a puff pastry having improved texture comprising baking a multi-layered laminate of dough and roll-in shortening wherein a dextrin is partially substituted for the flour used to make the dough.

2. The process of claim 1 wherein the dextrin is selected from the group consisting of tapioca dextrin potato dextrin, sago dextrin, wheat dextrin, sorghum dextrin, and corn dextrin.

3. The process of claim 1 comprising adding wheat gluten to the dough in addition to the gluten present in the flour.

4. The process of claim 1 wherein the flour is a high-protein flour.

5. The process of claim 4 wherein the high-protein flour is spring wheat flour.

6. The process of claim 4 wherein the high-protein flour has about 14 percent by weight protein.

7. The process of claim 1 wherein the flour is selected from the group consisting of bread flour, corn flour, potato flour, pastry flour, cracker flour, and cake flour.

8. The process of claim 7 wherein the flour is bread flour.

9. The puff pastry produced by baking a multi-layered laminate comprising alternating layers of a dough and a roll-in shortening wherein said dough comprises:
    (a) from about 30 to about 42 weight percent of flour,
    (b) from about 3 to about 8 weight percent of a fat,
    (c) from about 32 to about 40 weight percent of water,
    (d) from about 2 to about 15 weight percent of gluten, and
    (e) from about 14 to about 29 weight percent of a dextrin selected from the group consisting of tapioca dextrin, potato dextrin, sago dextrin, sorghum dextrin, wheat dextrin, and corn dextrin, and wherein said roll-in shortening is present in said laminate in an amount from about 20 to about 45 weight percent of said dough.

10. The puff pastry of claim 9 wherein said dough comprises:
    (a) from about 33 to about 36 weight percent of flour,
    (b) from about 3.2 to about 4.0 weight percent of a fat,
    (c) from about 35 to about 38 weight percent of water,
    (d) from about 3 to about 7 weight percent of gluten, and
    (e) from about 20 to about 25 weight percent of a dextrin.

11. The puff pastry of claim 9 wherein said dough additionally contains one or more of the following:
    (a) food grade acidulent,
    (b) flavoring agent,
    (c) food coloring,
    (d) salt,
    (e) minerals, and
    (f) vitamins.

12. The puff pastry of claim 9 wherein said fat is an unsaturated or saturated fat.

13. The puff pastry of claim 12 wherein said fat has a melting point of from 90° to 125° F.

14. The puff pastry of claim 9 wherein the flour is selected from the group consisting of bread flour, corn flour, potato flour, pastry flour, cracker flour, and cake flour.

15. The puffed pastry of claim 14 wherein said flour is bread flour.

16. The puff pastry of claim 9 additionally comprising a filling.

17. The puff pastry of claim 16 wherein said filling is a thermostable creme.

18. A puff pastry produced by baking a multi-layered laminate comprising alternating layers of a dough and roll-in shortening wherein said dough comprises:
    (a) from about 38 to about 49 weight percent of high-protein flour,
    (b) from about 3 to about 8 weight percent of a fat,
    (c) from about 32 to about 40 weight percent of water, and
    (d) from about 14 to about 29 weight percent of a dextrin selected from the group consisting of tapioca dextrin, potato dextrin, sago dextrin, sorghum dextrin, wheat dextrin, and corn dextrin, and wherein said roll-in shortening is present in the laminate in an amount from about 20 to about 45 weight percent of said dough.

19. The puff pastry of claim 18 wherein said dough comprises:
    (a) from about 42 to about 46 weight percent of high-protein flour,
    (b) from about 3.2 to about 4.0 weight percent of a fat,
    (c) from about 35 to about 38 weight percent of water, and
    (d) from about 20 to about 25 weight percent of a dextrin.

20. The puff pastry of claim 18 wherein said dough additionally contains one or more of the following:
    (a) food grade acidulent,
    (b) flavoring agent,
    (c) food coloring,
    (d) salt,
    (e) minerals, and
    (f) vitamins.

21. The puff pastry of claim 18 additionally comprising a filling.

22. The puff pastry of claim 21 wherein said filling is a thermostable creme.

23. A multi-layered laminate capable of being baked to produce a puff pastry comprising alternating layers of a dough and a roll-in shortening wherein said dough comprises:
  (a) from about 30 to about 42 weight percent of flour,
  (b) from about 3 to about 8 weight percent of a fat,
  (c) from about 32 to about 40 weight percent of water,
  (d) from about 2 to about 15 weight percent of gluten, and
  (e) from about 14 to about 29 weight percent of a dextrin selected from the group consisting of tapioca dextrin, potato dextrin, sago dextrin, sorghum dextrin, wheat dextrin, and corn dextrin, and wherein said roll-in shortening is present in said laminate in an amount from about 20 to about 45 weight percent of said dough.

24. The multi-layered laminate of claim 23 wherein said dough comprises:
  (a) from about 33 to about 36 weight percent of flour,
  (b) from about 3.2 to about 4.0 weight percent of a fat,
  (c) from about 35 to about 38 weight percent of water,
  (d) from about 3 to about 7 weight percent of gluten, and
  (e) from about 20 to about 25 weight percent of a dextrin selected from the group consisting of tapioca dextrin, potato dextrin, sago dextrin, sorghum dextrin, wheat dextrin, and corn dextrin, and wherein said roll-in shortening is present in said laminate in an amount from about 20 to about 45 weight percent of said dough.

25. A multi-layered laminate capable of being baked to produce a puff pastry comprising alernating layers of a dough and a roll-in shortening wherein said dough comprises:
  (a) from about 38 to about 49 weight percent of high-protein flour,
  (b) from about 3 to about 8 weight percent of a fat,
  (c) from about 32 to about 40 weight percent of water,
  (d) from about 14 to about 29 weight percent of a dextrin selected from the group consisting of tapioca dextrin, potato dextrin, sago dextrin, sorghum dextrin, wheat dextrin, and corn dextrin, and wherein said roll-in shortening is present in the laminate in an amount from about 20 to about 45 weight percent of said dough.

26. The multi-layered laminate of claim 25 wherein said dough comprises:
  (a) from about 42 to about 46 weight percent of high-protein flour,
  (b) from about 3.2 to about 4.0 weight percent of a fat,
  (c) from about 35 to about 38 weight percent of water, and
  (d) from about 20 to about 25 weight percent of a dextrin.

27. The multi-layered laminate of claim 25 further comprising a filling.

28. The multi-layered laminate of claim 27 wherein said filling is a thermostable creme.

UNITED STATES PATENT AND TRADEMARK OFFICE
CERTIFICATE OF CORRECTION

PATENT NO. : 4,622,226
DATED : November 11, 1986
INVENTOR(S) : VICTOR H. KE ET AL.

It is certified that error appears in the above-identified patent and that said Letters Patent is hereby corrected as shown below:

Column 6, line 15, in example 5, in the column headed "Grams", "388.80", should be --338.80--, Column 7, claim 1, last line, after "dough" insert --and wherein the dextrin is present in amounts of from about 14 to about 29 weight percent of the dough--.

Signed and Sealed this

Twenty-fourth Day of February, 1987

Attest:

DONALD J. QUIGG

Attesting Officer     Commissioner of Patents and Trademarks